US008747971B2

(12) United States Patent
Bastioli et al.

(10) Patent No.: US 8,747,971 B2
(45) Date of Patent: Jun. 10, 2014

(54) HIGHLY-BREATHABLE BIODEGRADABLE FILM BAG

(75) Inventors: Catia Bastioli, Novara (IT); Gianfranco Del Tredici, Sesto Calende (IT); Roberto Ponti, Marano Ticino (IT); Maurizio Tosin, Serravalle Sesia (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 11/547,966

(22) PCT Filed: Apr. 7, 2005

(86) PCT No.: PCT/EP2005/003865
§ 371 (c)(1),
(2), (4) Date: Oct. 10, 2006

(87) PCT Pub. No.: WO2005/097875
PCT Pub. Date: Oct. 20, 2005

(65) Prior Publication Data
US 2008/0038496 A1    Feb. 14, 2008

(30) Foreign Application Priority Data
Apr. 9, 2004 (IT) .............................. MI2004A0720

(51) Int. Cl.
*C08F 20/00* (2006.01)

(52) U.S. Cl.
USPC ......... 428/35.2; 428/34.1; 525/437; 525/444; 525/450

(58) Field of Classification Search
USPC ............ 428/220, 323, 36.6, 35.1, 411.1, 910; 264/444; 156/291; 604/14; 493/150; 524/39, 55; 106/156.51; 528/354
See application file for complete search history.

(56) References Cited

U.S. PATENT DOCUMENTS

| 5,405,561 | A  | * | 4/1995 | Dais et al. .................... 264/40.1 |
| 6,573,340 | B1 | * | 6/2003 | Khemani et al. .............. 525/437 |
| 7,071,249 | B2 | * | 7/2006 | Ho et al. .......................... 524/39 |
| 2002/0006989 | A1 | * | 1/2002 | Bastioli et al. .................. 524/47 |
| 2003/0021973 | A1 | * | 1/2003 | Topolkaraev et al. ......... 428/220 |
| 2003/0108701 | A1 | * | 6/2003 | Bond et al. .................... 428/35.7 |
| 2004/0068059 | A1 |   | 4/2004 | Katayama et al. |

FOREIGN PATENT DOCUMENTS

| JP | 2002294045 A | 10/2002 |
| WO | WO-94/16020 A2 | 7/1994 |
| WO | WO-02/42365 A1 | 5/2002 |
| WO | WO 0242365 * | 5/2002 |
| WO | WO-02/083784 A1 | 10/2002 |
| WO | WO-03/035753 A1 | 5/2003 |
| WO | WO-03089493 A1 | 10/2003 |

OTHER PUBLICATIONS

"Modelling the moisture vapour transmission rate through segmented block co-poly (ether-ester) based breathable films" Stroeks et al., *Polymer* 42, (2001), pp. 117-127.

* cited by examiner

*Primary Examiner* — Ellen S Raudenbush
(74) *Attorney, Agent, or Firm* — Novak Druce Connolly Bove + Quigg LLP

(57) ABSTRACT

Bag made of a breathable biodegradable uniform film having thickness from 10 to 40 μm and with permeability to water greater than 950 g 30 μm/m² 24 h in which the biodegradable film comprises starch and possibly a thermoplastic polymer insoluble in water with melting temperature between 60° C. and 150° C.

9 Claims, No Drawings

HIGHLY-BREATHABLE BIODEGRADABLE FILM BAG

CROSS-REFERENCE TO RELATED APPLICATIONS

This application is a National Stage of PCT/EP2005/003865 filed Apr. 7, 2005 which in turn claims priority from Italian Application MI2004A000720, filed Apr. 9, 2004.

The present invention refers to a bag made of a biodegradable uniform film characterised by a high level of breathability which makes it particularly suitable for the purposes of industrial composting.

Composting indicates the industrial process that imitates the processes, reproducing them in a controlled and accelerated form, which in nature return the organic substances to the life cycle. In nature the organic substance produced and no longer "useful" for life (dry leaves, branches, animal remains etc.) is decomposed by the micro organisms present in the soil which return it to the natural cycle. The less degradable components remaining constitute the humus which therefore represents an important food supply for plants given its capacity to release the nutritive elements (nitrogen, phosphorous, potassium etc.) slowly but constantly, ensuring constant fertility of the ground. Industrial composting is therefore a process in which structures are provided for rational management of the microbiological activities that occur spontaneously in nature with the aim of reducing the time necessary to obtain a type of humus, i.e. the compost, and improve the quality of the end product with respect to the product obtained naturally. Industrial composting has been the subject of many studies and many composting plants have adopted very sophisticated processes and equipment. One of the main economic obstacles, however, to the spread of industrial composting of organic waste lies in the high cost of the composting which depends on the weight of the organic material to be transformed. The bag made of the highly-breathable biodegradable uniform film according to the present invention facilitates the development of a differentiated collection of organic waste since, due to the uniformity and high breathability of the bag, the organic part to be disposed of undergoes a considerable weight loss while it is still in the bag.

This is all the more important in consideration of the fact that differentiated collection of organic waste is becoming increasingly necessary also as a result of the European regulation which will make it obligatory by the end of 2006 not to dump waste with an organic content of above 5%.

If, in the light of the above regulation, it is borne in mind that the total quantity of urban waste in Italy alone is estimated to be in the order of approximately 24 Ml tons and the content of putrescible material in the order of 11.4 Ml tons, the importance of stabilising the waste and enhancing it via rapid composting or bio-stabilisation is evident.

Even in the current scenario in which this type of waste is dumped, the advantages of the biodegradable bag according to the invention are remarkable. The putrescible waste consists of water for over 60% of its content and the loss of even only 10% in weight results, at the level of the country as a whole, in a loss of hundreds of thousands of tons of water. Apart from the direct economic saving, this means among other things thousands of tons less water in the rubbish dump, more stabilised waste reducing the problems of smell, and saving on thousands of lorry trips to and from the dump. The sale of a bag with these characteristics by supermarkets, in the form of shoppers, would also permit a significant reduction in waste disposal costs for the municipalities and, at the same time, would make the management of the differentiated collection of putrescible waste much simpler.

The biodegradable bag of the invention can also be in the form of a shopper designed for re-use, at the end of its useful life, as a bag for the collection of food scraps. This would also reduce the likelihood of the shopper being left lying around in the environment.

DESCRIPTION OF THE INVENTION

The present invention refers to a bag made by a breathable biodegradable uniform film, the film having a thickness of from 10 to 40 µm and a permeability to water greater than 950 g 30 µm/m² 24 h measured according to ASTM E96-90.

In the present description uniform film means a film with substantial absence of defects both at microscopic and macroscopic level.

The breathable biodegradable uniform film is made by biodegradable materials. Preferred materials are biodegradable polyesters and biodegradable starch based blends. Aliphatic-aromatic polyesters of the diacids-diols type are particularly preferred among polyesters. Blend of starch and aliphatic-aromatic polyesters are particularly preferred among starch based blends.

With reference to the diacids-diols type biodegradable polyesters, examples of dicarboxylic acid include oxalic, malonic, succinic, glutaric, adipic, pimelic, suberic, azelaic, sebacic, undecanedioic, dodecanedioic and brassylic acids.

Examples of polyfunctional aromatic compounds include phthalic acids, in particular terephthalic acid, bisphenol A, hydroquinone, and the like.

Examples of diols include 1,2-ethandiol, 1,2-propandiol, 1,3-propandiol, 1,4-butandiol, 1,6-hexandiol, 1,7-heptandiol, 1,8-octandiol, 1,9-nonandiol, 1,10-decandiol, 1,11-undecandiol, 1,12-dodecandiol, 1,4-cyclohexandimethanol, neopentylglycol, 2-methyl-1,3-propandiol, dianhydrosorbitol, dianhydromannitol, dianhydroiditol, cyclohexandiol, cyclohexanmethandiol.

In addition to the dicarboxylic acid and the diol, the biodegradable polyester may advantageously comprise as starting monomer also an unsaturated comonomer of either natural or synthetic origin. The amount of unsaturated comonomer is within the range of 0.5 to 45% of the sum dicarboxylic acid/diol.

Examples of unsaturated acids of synthetic origin include malonic acid, fumaric acid, vinyl acetate, acrylic and methacrylic acids, hydroxyalkylacrylates and hydroxyalkylmethacrylates.

Examples of unsaturated comonomers of natural origin are itaconic acid, monounsaturated hydroxyacids, such as ricinoleic acid and lesquerolic acid, and mono-, or polyunsaturated monocarboxylic acids, such as oleic, erucic, linoleic, linolenic acids.

The aliphatic-aromatic polyester may also include, in addition to the base monomers, at least a hydroxy acid in an amount in the range from 0 to 30% moles based on the moles of the aliphatic dicarboxylic acid. Examples of suitable hydroxy acids include glycolic acid, hydroxybutyric acid, hydroxycaproic acid, hydroxyvaleric acid, 7-hydroxyheptanoic acid, 8-hydroxycaproic acid, 9-hydroxynonanoic acid and lactic acid.

With reference to the starch based blends, with the term starch it is meant any kind of natural starch such as corn, potato, wheat, tapioca, pea starch and so on. The term starch comprises also chemically or physically modified starch and it possible to mention, for instance, starch esters with a substitution degree within the range of 0.2 to 2.5, hydroxypropylated starches, and starches modified with fatty chains. Starch may also be used either in the destructurized or the gelatinized form.

In a particularly preferred starch based blend film, the starch is present as a co-continuous phase or as dispersed phase in the polymeric matrix. In the latter case the starch is dispersed in particles having dimensions less than 1 μm preferably less than 0.6 μm.

At present differentiated waste collection is in many cases carried out using biodegradable bags which, especially if produced with starch-based film, are able to lose water due to the hydrophilic nature of the material.

The bags according to the present invention derived from biodegradable uniform film with thickness between 10 and 40 μm and with permeability greater than 950 g 30 μm/m² 24 h, preferably higher than 1000 g 30 μm/m² 24 h, and even more preferably >11.00 g 30 μm/m² 24 h, can reduce, in particular if not placed inside a closed container, the organic waste by over 15% by weight of the waste itself, and preferably over 20%, in less than 7 days, preferably in less than 4 days.

It has been found that when the film has a breathability above 4000 g 30 μm/m² 24 h it is no more suitable to be used for the production of bags according to the invention. Preferably the breathability lies below 3000 g 30 μm/m² 24 h and even more preferably below 2500 g 30 μm/m².

To test the properties of the bag, it can be filled with sawdust to which water completely absorbed by the sawdust itself has been added (normally approximately 20% sawdust and 80% water) and then rested on a grille with sufficiently wide mesh to permit aeration also under the bottom of the bag. The bag can be placed in an environment conditioned at 23° C. with 55% RH and the weight loss can be measured by weighing.

Bags with a high surface area with respect to volume are particularly suitable for the purpose. Bags with volume between 5 and 40 l, preferably between 10 and 30 l, are therefore particularly suitable for the purpose. The property of being breathable can in some cases be useful also in large bags for non-differentiated waste collection as it permits the loss of a certain amount of water with consequent increase in the caloric power of the waste.

The present invention comprises not only biodegradable bags made of material sufficiently hydrophilic to reach permeability values on film of >950 g 30 μm/m² 24 h or, but also bags made of less breathable films that reach the breathability level of 950 g 30 μm/m² 24 h or more by a micro perforation process via laser or via stretching with inorganic or organic fillers, such process being able to form micro holes. With the term microholes it is meant holes that make the film permeable to water vapour but substantially impermeable to liquid water at atmospheric pressure. Bags made of starch based films are particularly preferred since they are characterized by a good biodegradation capacity even at room temperature (so called "home compostability").

The starch-based films according to the invention must contain thermoplastic starch in a quantity of between 20% and 90%, more preferably between 25% and 60% of the total composition. Thermoplastic polymers insoluble in water (absorption of water below 5% and preferably below 2%) with melting points between 60° C. and 154° C. provided with good compatibility with starch are another essential component. The same polymers can be the basic raw material for bags obtained by micro perforation.

The mechanical properties must be sufficient for the application. This means: tensile properties, measured on 25-30 μm films at 23° C. and 55% RH, with ultimate tensile strength greater than 16 MPa, modulus >50 MPa, ultimate elongation >300% and preferably ultimate tensile strength greater than 22 MPa, modulus >100 MPa, ultimate elongation >350%.

EXAMPLE 1

A composition containing 36.4% starch Globe 03401 Cerestar

50% Ecoflex® (BASF)

13.6% glycerine 0.2 parts of Erucamide was placed in a twin-screw extruder OMC, D=50 mm, L/D=36 operating with temperature profile 60/140/175/180× 4/155×2 at 300 rpm and with degassing to bring the final water content to below 1%.

The granules thus obtained were fed to a Ghioldi filming machine, D=40 mm, L/D=30 operating with temperature profile 120/135/145×7 at 64 rpm. A film with breathability of 1460 g 30 μm/m² 24 h according to ASTM E 96-90 was obtained.

Bags of various volumes were produced with said film.

Three bags, sampled at random from a uniform batch, were then used for the following test. A mixture of sawdust and water in a mass ratio of 1 to 4 was prepared in a suitable container. The bags were then filled with the damp sawdust prepared. Table 1 shows the filling load according to the bag volume, indicating two typical commercial bag sizes. With bags of different volume, the quantity of sawdust-water mixture to be used must be varied proportionally.

For example if the bag has a volume equal to 15 liters, the weight of the sawdust-water mixture must be equal to:

$$X = \frac{1.5}{6.5} * 15 = 3.46 \text{ kg}$$

TABLE 1

| Bag volume (litres) | Wet sawdust (kg) |
|---|---|
| 6.5 | 1.5 |
| 10 | 2.3 |

After filling, the bags were closed at approximately 5 cm from the opening using the tie provided with the bag or a piece of string. The bags were then rested on a grille having cells with sides between 1.5 cm and 5 cm made of metal or plastic wire. The grille was then suspended at 5 cm at least from the ground. The test was carried out in an environment conditioned at 23° C. (±2) with 55% RH (±2). The bags were then weighed at the beginning of the test and after 7 days.

The difference between initial weight $T_0$ and final weight $T_f$ of each bag was determined as $D=(T_0-T_f)$ and the mean $D_m$ of the individual differences was also determined:

$$D_m = \frac{1}{3}\Sigma_{1,3}D$$

The bags remained intact for the entire test period and the variation between Dm and D does not exceed 10%.

The weight loss values are given in Tables 2 and 3.

TABLE 2

Bags: 20 μm; 6.5 l
Content: 300 g sawdust and 1200 g water
3 repetitions

| Days | Bag 1 | Bag 2 | Bag 3 | Mean |
|---|---|---|---|---|
| | | Weight loss (g) | | |
| 0 | 0 | 0 | 0 | 0 |
| 1 | 46.45 | 45.85 | 43.2 | 45.17 |
| 2 | 91.65 | 90.3 | 84.2 | 88.72 |
| 3 | 130.35 | 127.9 | 119.7 | 125.98 |
| 6 | 248.95 | 243.75 | 229.15 | 240.62 |
| 7 | 292.1 | 286.45 | 269.5 | 282.68 |
| | | Weight loss % | | |
| 0 | 0 | 0 | 0 | 0 |
| 1 | 3.10 | 3.06 | 2.88 | 3.01 |
| 2 | 6.11 | 6.02 | 5.61 | 5.91 |
| 3 | 8.69 | 8.53 | 7.98 | 8.40 |
| 6 | 16.60 | 16.25 | 15.28 | 16.04 |
| 7 | 19.47 | 19.10 | 17.97 | 18.84 |

TABLE 3

Bags: 20 μm; 10 l
Content: 462 g sawdust and 1848 g water
3 repetitions

| Days | Bag 1 | Bag 2 | Bag 3 | Mean |
|---|---|---|---|---|
| | | Weight loss (g) | | |
| 0 | 0 | 0 | 0 | 0 |
| 1 | 66 | 66 | 68 | 66.67 |
| 2 | 133 | 135 | 130 | 132.67 |
| 3 | 206 | 211 | 208 | 208.33 |
| 4 | 266 | 273 | 272 | 270.33 |
| 7 | 453 | 457 | 461 | 457.00 |
| | | Weight loss % | | |
| 0 | 0 | 0 | 0 | 0 |
| 1 | 2.86 | 2.86 | 2.94 | 2.89 |
| 2 | 5.76 | 5.84 | 5.63 | 5.74 |
| 3 | 8.92 | 9.13 | 9.00 | 9.02 |
| 4 | 11.52 | 11.82 | 11.77 | 11.70 |
| 7 | 19.61 | 19.78 | 19.96 | 19.78 |

EXAMPLE 2

Comparison

Experiment 1 was repeated with the following composition:
28.0% starch Globe 03401 Cerestar
65.7% Ecoflex® (BASF)
6.0% glycerine
0.3% parts of Erucamide A film with breathability of 850 g 30 μm/m² 24 h according to ASTM E 96-90 was obtained. Bags of 20 μm thickness and 10 l volume were produced with said film. The test of example 1 was repeated and the weight loss mean value detected after 7 days was of 157.3 g, corresponding to a weight loss % of about 10.48%.

The invention claimed is:

1. A bag made of a breathable biodegradable uniform film comprising starch blended with an aliphatic-aromatic polyester of the diacid-diol type, wherein the amount of starch is between 25% and 60% of the total composition, said film having a thickness of from 10 to 40 μm, a permeability to water greater than 950 g 30 μm/m² 24 h, and the following tensile properties measured on 25-30 μm films at 23° C. and 55% RH: ultimate tensile strength greater than 16 MPa, modulus >50 MPa, and ultimate elongation >300%.

2. The bag according to claim 1, wherein the permeability to water of the breathable biodegradable uniform film is greater than 1000 g 30 μm/m² 24 h.

3. The bag according to claim 1, wherein the permeability to water of the breathable biodegradable uniform film is greater than 1100 g 30 μm/m² 24 h.

4. The bag according to claim 1, wherein the starch is blended with aliphatic-aromatic polyesters of the diacid-diol type with melting points between 60° C. and 150° C.

5. The bag according to claim 1, wherein said breathable biodegradable uniform film comprises microholes.

6. The bag according to claim 1, wherein the permeability to water of said breathable biodegradable uniform film is less than 4000 g 30 μm/m² 24 h.

7. The bag according to claim 1, having a volume between 5 and 40 liters.

8. The bag according to claim 1, wherein the aliphatic-aromatic polyester of the diacid-diol type comprises:
a polyfunctional aromatic compound selected from terephthalic acid, bisphenol A, hydroquinone;
a dicarboxylic acid selected from oxalic, malonic, succinic, glutaric, adipic, pimelic, suberic, azelaic, sebacic, undecanedioic, dodecanedioic and bras sylic acid; and
a diol selected from 1,2-ethandiol, 1,2-propandiol, 1,3-propandiol, 1,4-butandiol, 1,6-hexandiol, 1,7-heptandiol, 1,8-octandiol, 1,9-nonandiol, 1,10-decandiol, 1,11-undecandiol, 1,12-dodecandiol, 1,4-cyclohexandimethanol, neopentylglycol, 2-methyl-1,3-propandiol, dianhydrosorbitol, dianhydromannitol, dianhydroiditol, cyclohexandiol, and cyclohexanmethandiol.

9. The bag according to claim 1, wherein the aliphatic-aromatic polyester of the diacid-diol type comprises terephthalic acid, adipic acid, and 1,4-butandiol.

* * * * *